No. 695,394. Patented Mar. 11, 1902.
C. HIRD.
CUSHION TIRE.
(Application filed Nov. 1, 1901.)
(No Model.) 2 Sheets—Sheet 1.
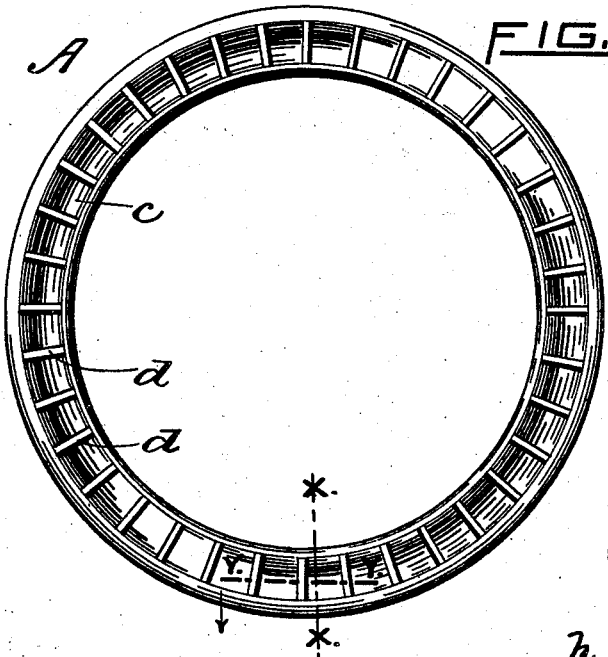
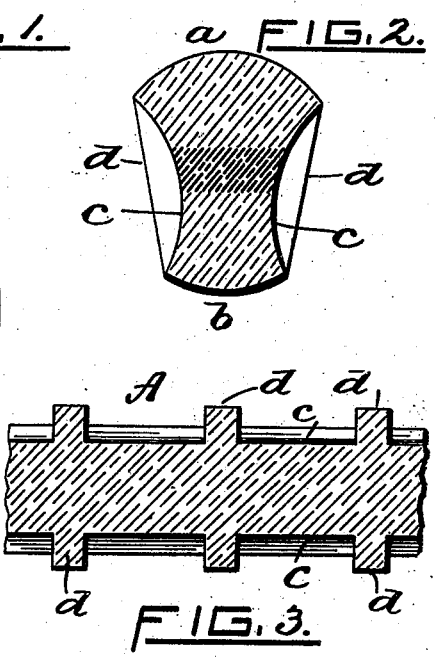
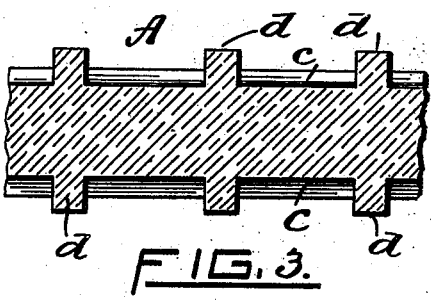
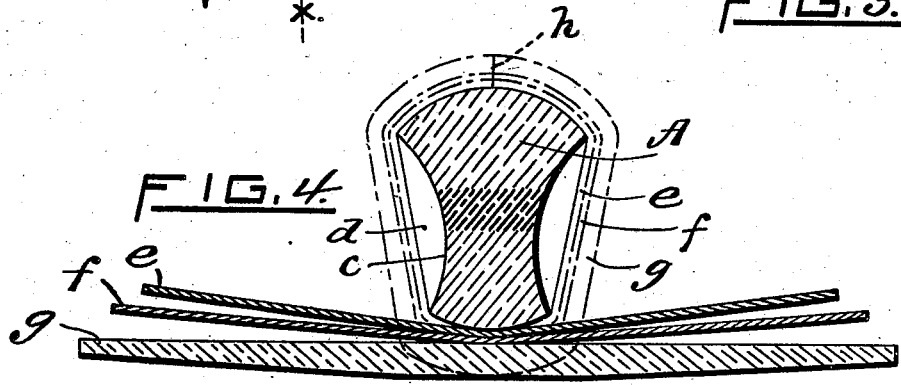
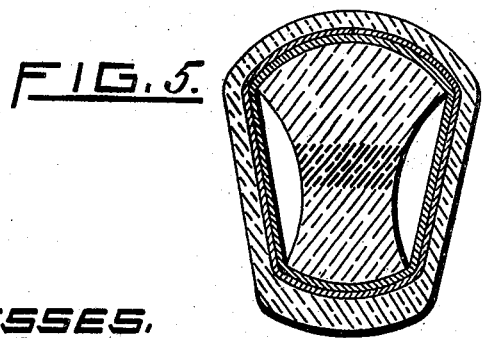
WITNESSES. INVENTOR.

No. 695,394. Patented Mar. 11, 1902.
C. HIRD.
CUSHION TIRE.
(Application filed Nov. 1, 1901.)
(No Model.) 2 Sheets—Sheet 2.

WITNESSES.
Livingston Ham
Ernest C. Church

INVENTOR.
Charles Hird
By Charles T. Hannigan,
Attorney.

United States Patent Office.

CHARLES HIRD, OF WOONSOCKET, RHODE ISLAND, ASSIGNOR OF FORTY-NINE ONE-HUNDREDTHS TO PATRICK J. McCARTHY, OF PROVIDENCE, RHODE ISLAND.

CUSHION-TIRE.

SPECIFICATION forming part of Letters Patent No. 695,394, dated March 11, 1902.

Application filed November 1, 1901. Serial No. 80,806. (No model.)

*To all whom it may concern:*

Be it known that I, CHARLES HIRD, a subject of the King of Great Britain, residing at the city of Woonsocket, in the county of Providence and State of Rhode Island, have invented certain new and useful Improvements in Cushion-Tires, of which the following is a specification.

My invention relates to the novel construction of a core and its casing to constitute a vehicle-tire.

The invention consists in a core composed of two grades of rubber which are cast in one continuous piece to form the circle of the tire, said core provided with concave sides which are divided by ribs situated equidistant apart and extending radially with the axial center of the core, so arranged to expose a series of cells opposite of each other throughout the circle of the core, in combination therewith of a casing consisting of fabric and strips of rubber of a size to encircle the said core, so that when placed in a suitable flask and given the proper degree of heat the said rubber parts unite and form a continuous tire in the manner as hereinafter described and claimed.

Figures 6, 7:
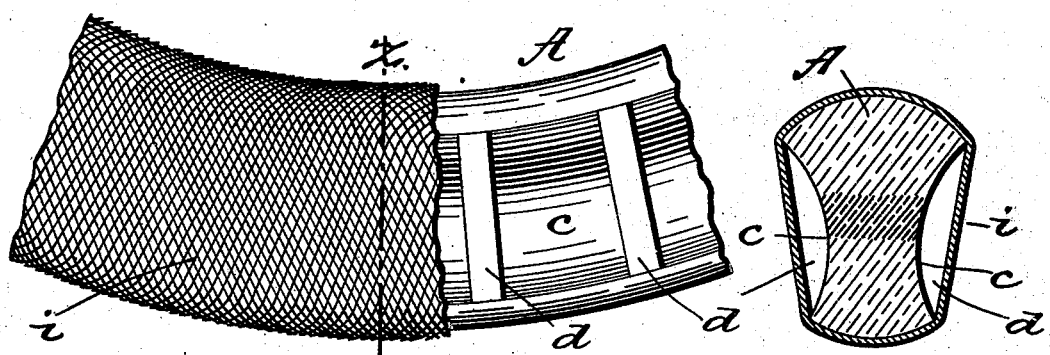
Figure 8:
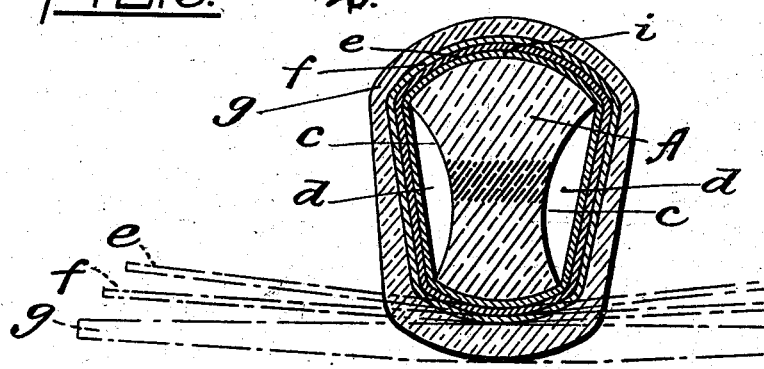
Figure 9:
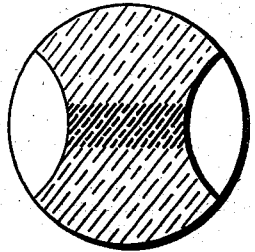
Figure 10:
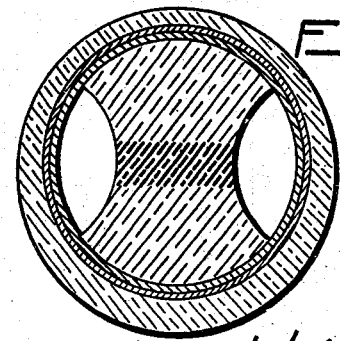

In the accompanying two sheets of drawings, Figure 1 represents a side elevation of my improved cellular core. Fig. 2 is an enlarged cross-sectional view taken in line $x\ x$ of the same. Fig. 3 is a partial top plan sectional view of the core, taken in line $y\ y$ of Fig. 1. Fig. 4 is a cross-sectional view of the core and strips which form the casing, consisting of rubber, fabric, and rubber, respectively, and also indicating the dotted position of the casing upon the core as prior to vulcanizing the rubber parts. Fig. 5 is a cross-sectional view of the tire complete. Fig. 6 is a partial side elevation of the core, having braid woven upon its exterior surface. Fig. 7 is a cross-sectional view taken in line $z\ z$ of the same. Fig. 8 is a cross-sectional view of the braided core and casing complete and showing the aforesaid strips in dotted position as prior to encircling the core. Fig. 9 is a cross-sectional view of the cellular core in a modified form, and Fig. 10 is a similar view of the same with its casing complete.

Like letters of reference indicate like parts in the different views of the drawings.

A represents a continuous rubber core, and, referring to the cross-section of the same in Fig. 2, this core is cast in a suitable flask, (not shown,) so as to expose inner and outer convex surfaces, as $a$ and $b$, respectively, the circle of each being of equal radius from the center of the core, and these convex surfaces terminate with concave sides $c\ c$.

$d\ d$ are ribs which are divided equidistant apart around the concave sides of the core opposite of each other, as shown in Fig. 3, and extending in a plane radially to the axial center of the core, as shown in Fig. 1. The outer surface $b$ of the core is made somewhat narrower than the inner surface $a$, so as to provide a narrow tread for the tire, and the outer faces of the ribs $d\ d$ incline in a plane terminating with the edges of the concavo-convex surfaces of the core, as shown in Fig. 2. Two different qualities of rubber are used in the molding of this core, a harder grade of rubber being used for the inner and outer portions of the core, with a softer or finer grade of rubber interposed between the first-aforesaid grade, as indicated by the darker section-lines in Fig. 2, so as to form a more yielding effect in the center of the core. This core is placed upon a series of strips, each made of rubber, fabric, and rubber, respectively, and of a size that when folded over the core, as indicated by dotted lines in Fig. 4, the side edges of the said strips meet together in the longitudinal center of the inner surface of the core, as at a point $h$, and the parts thus assembled are mounted in a suitable flask, which is placed in a heated press (not shown) to receive the proper degree of heat, whereby the rubber portions unite continuous of each other throughout the circle of the tire in the manner as illustrated in cross-section in Fig. 5.

I do not wish to limit myself to the exact construction of the casing for the core described, for instead of adhering the strip $e$ to the core in the vulcanization of the rubber the said core may be covered by braid *i*, as shown in Fig. 6, woven by suitable means upon the exterior surface of the core, after which the strips are used to complete the casing in the manner as hereinbefore described.

In Fig. 9 I show a slight modification of the core, whereby the same may be cast so as to expose a circular form in cross-section and which core is designed more particularly to sustain heavy loads, said core having the same construction of casing as above mentioned and receiving the proper degree of heat for vulcanizing the rubber parts integral with each other throughout the circle of the tire in the manner as shown in cross-section in Fig. 10.

By having the core provided with a plurality of cells in its longitudinal sides not only lessens the weight of the tire, but also affords a resiliency which would not be possessed by a solid core, and at the same time the ribs which divide the cells apart act as trusses to strengthen the central portion of the core.

From this description it will be readily seen that by my construction I form a cushion-tire that is strong, durable, and comparatively inexpensive to manufacture.

Having described my invention, what I claim is—

1. In a vehicle-tire, a core composed of two grades of rubber, one grade of which is of harder quality to form the inner and outer portions of the core, and the other grade being interposed between the first-said grade of rubber and of finer quality to more readily yield, said core cast in one piece to form the circle of the tire, and exposing inner and outer convex surfaces and provided with concave sides which are divided equidistant apart by ribs that extend radially to the axial center of the core, in combination therewith, of a casing consisting of three separate strips, each of rubber, fabric, and rubber, respectively, and of a length and width to encircle the said core, all of said parts arranged in a suitable flask and given the proper degree of heat whereby the said rubber parts unite and form a continuous tire, substantially as set forth.

2. In a vehicle-tire, a core composed of different grades of rubber as described, and cast together in one continuous piece to form the circle of the tire, said core having circular top and bottom surfaces and provided with concave sides that are divided apart by vertical ribs situated opposite of each other and having their front faces inwardly inclined from the top surface of the core, said core braided upon its exterior surface by suitable means, the combination therewith, of a casing consisting of a series of strips, each made of rubber, fabric, and rubber, respectively, and each of said strips of a size to encircle the said core, all of said parts adapted to be mounted in a suitable flask and given the proper degree of heat to vulcanize and make the said rubber strips integral with each other throughout the circle of the tire, substantially as set forth.

3. In a vehicle-tire, a circular core cast in one continuous piece and composed of two grades of rubber the softer grade of which being located centrally of the core, said core provided with concave sides having ribs divided equidistant apart around the circle of the core, in combination therewith, of a casing consisting of three strips, each of rubber, fabric, and rubber, respectively, and all of a length and width to fold over the said core, so arranged that when placed in a suitable flask and given the proper degree of heat the vulcanization makes the said rubber parts continuous of each other throughout the circle of the tire, substantially as set forth.

In testimony whereof I affix my signature in presence of two witnesses.

CHARLES HIRD.

Witnesses:
LIVINGSTON HAM,
ERNEST C. CHURCH.